UNITED STATES PATENT OFFICE.

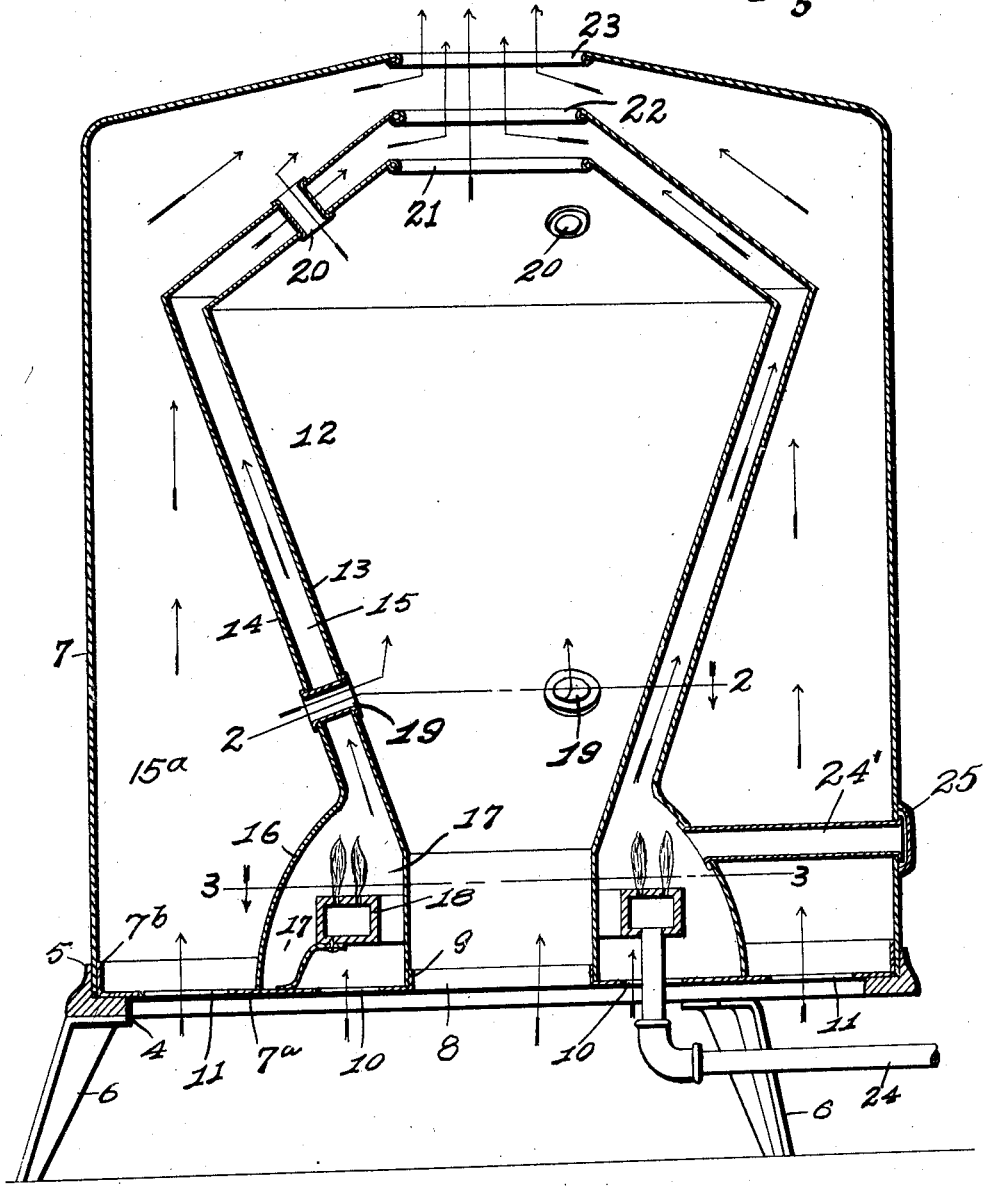

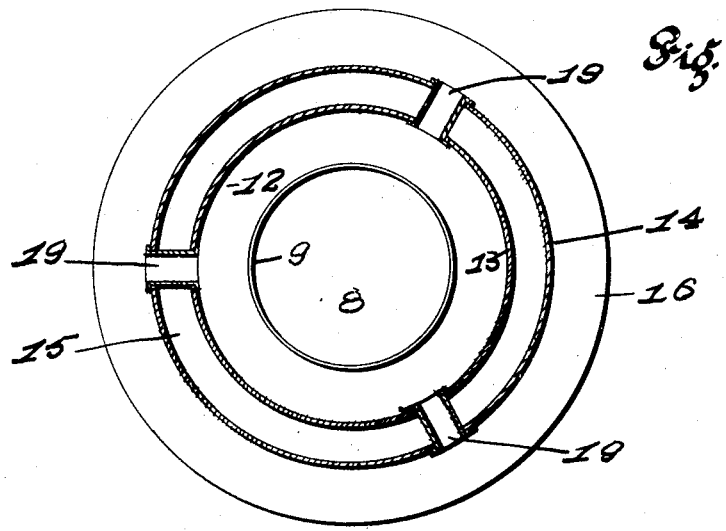
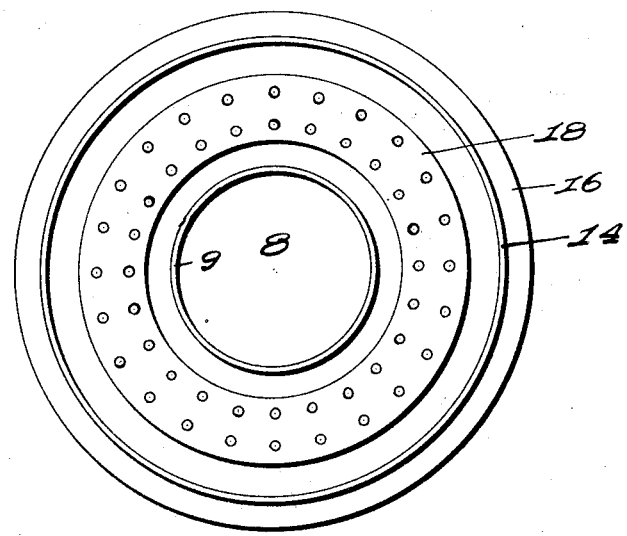

GEORGE W. SHARP, OF ST. LOUIS, MISSOURI.

HEATER.

1,405,943.  Specification of Letters Patent.  Patented Feb. 7, 1922.

Application filed June 14, 1919. Serial No. 304,128.

*To all whom it may concern:*

Be it known that I, GEORGE W. SHARP, a citizen of the United States, and resident of the city of St. Louis and State of Missouri, have invented certain new and useful Improvements in Heaters, of which the following is a specification, containing a full, clear, and exact description, reference being had to the accompanying drawings, forming a part hereof.

This invention relates to certain new and useful improvements in gas heaters and has for its primary object a heater which is circular in form and is principally designed to burn natural gas, but may also be utilized for artificial gas.

A further object is to construct a gas heater which will superheat the air and at the same time sterilize it, as well as to consume all of the products of combustion except air, so that revitalized and sterilized air only will pass from the heater.

In the drawings:

Fig. 1 is a vertical cross sectional view of the device.

Fig. 2 is a horizontal sectional view taken on the line 2—2 of Fig. 1.

Fig. 3 is a horizontal sectional view taken on the line 3—3 of Fig. 1.

In the construction of this device, a base 4 is used, this base being ring shaped in form and is provided with an upwardly extending flange 5 and with the legs 6 which raise it from the floor. On this base is placed a heating drum 7 which is preferably cylindrical in form, although the same may be made of any shape.

This heating drum is placed over the bottom 7ª which bottom is provided at its center with an opening 8, the opening 8 being surrounded by an upwardly extending flange 9. The opening 8 and the flange 9 are circular in form. The bottom 7ª is further provided with perforations 10 and 11, these perforations being of any desired number and size. The perforations 11 admit air into the drum 7, and the perforations 10 supply air to the combustion chamber.

Within the drum and having its lower end surrounding the flange 9 is a heating chamber 12, which is preferably made in the shape of a double truncated cone, and having two walls 13 and 14 and an air space 15 between these walls. The lower portion of the wall 14 is provided with a flaring end 16 so as to form with the wall 13 a chamber 17 and in this chamber the burner 18 is located, the burner 18 being of a shape to conform with that of the lower end of the heating chamber 12.

In the lower portion of the heating chamber 12 are placed a plurality of flues 19 which extend through the walls 13 and 14 and are securely crimped or flared. The upper portion of the heating chamber 12 is likewise provided with flues 20 which are secured in the same manner. In line with the opening 8 the walls 13 and 14 are provided with the openings 21 and 22 respectively, these openings communicating and being directly beneath the opening 23 formed in the drum 7. Attached to the burner 18 is the pipe connection 24 which leads to any suitable source of supply.

In Fig. 1 the direction of the flow of air, from its admittance to the heater until its exit, is clearly shown by means of arrows, and it will be noted that a portion of the air entering the drum will pass through the flues 19 into the interior of the heating chamber 12, and a portion of this air will find its exit through the flues 20. Most of the air contained within the drum 7 will pass directly upward in the drum and through the opening 23. The air passing through the openings 10 will circulate around the flues 19 and 20 and find its exit through the opening 22, while the balance of the air contained within the interior of the heating chamber will pass out through the opening 21.

It can be readily seen that the wall 13 of the heating chamber will become intensely heated and will impart its heat to the air contained within the chamber 12 and also in the air space 15, this heat also being radiated to the wall 14 which will in turn heat the air contained within the drum 7, thus allowing superheated sterilized air to issue from the opening 23 into the room.

It will be seen by the use of this device, that the foul air is taken from near the floor sterilized and sent forth into the room as revitalized air, or in other words that most of the germs are destroyed and the dust particles consumed, thus purifying the air.

As will be noted in Fig. 1, I make use of a pipe 24' which forms a closed passage between the chamber 17 in which the burner 18 is located and the outside of the heating drum 7. The object of this passage is to allow passage for ignition means when a pilot light is not used. This passage is closed by the door 25 so that no air will enter therethrough.

It will also be noted that I may stagger the openings 19 and 20 so as to provide additional circulation of the air within the heating chamber before it escapes therefrom.

It will be further observed that by my construction of stove I have provided what might be termed three heating chambers, the heating chamber 12, as previously referred to; the heating chamber 15, as also previously mentioned; and the heating chamber 15$^a$ between the interior surface of the drum 7 and the wall 14. All of these heating chambers being provided with air intakes at the bottom so that the air from the room can enter each chamber direct. And it also may be further observed that the chambers 15$^a$ and 12 are in direct communication with each other. It also may be further noted that the bottom 7$^a$ is provided with a peripheral flange 7$^b$, and when the device is assembled the lower edge of the drum 7 rests between the flanges 5 and 7$^b$ and holds it in firm position, the flange 7$^b$ preventing the bottom of the drum from being pushed inward, the flange 5 preventing outward movement of the lower edge of the drum.

Having fully described my invention, what I claim is:

A gas heater comprising a base having an upturned flange, a bottom provided with a peripheral flange and with a central opening having a surrounding flange and a series of openings secured to said base, a drum mounted on said base and seated between the upturned flange of the base and the peripheral flange of the bottom, a double walled heating chamber in the form of a double truncated cone located within the drum and forming a warming and circulating chamber between its outside surface and inside surface of the drum, the inner wall of said heating chamber being seated on the bottom and fitted around the flange of the central opening formed on said bottom, the lower portion of the outer wall of the heating chamber being flared outwardly so as to form a circular combustion chamber between the walls of the heating chamber, a gas burner located within the combustion chamber and surrounding the inner wall of the heating chamber, an enclosed igniting passage extending through the drum and outer wall of the heating chamber, a closure for said igniting passage, a series of upwardly inclined closed passages extending radially through the walls of the heating chamber adjacent the combustion chamber, and a series of similar inclined passages extending through the walls of the heating chamber adjacent the top thereof, said passages affording direct communication between the interior of the heating chamber and the warming and circulating chamber surrounding the heating chamber, and aligned openings formed in the top of the drum and in the upper portions of both walls of the heating chamber so as to provide an uninterrupted central air passage from and through the bottom of the heater to the top thereof and as an uninterrupted outlet for the heated air in the combustion chamber before its final discharge.

In testimony whereof, I have signed my name to this specification, in presence of two subscribing witnesses.

GEORGE W. SHARP.

Witnesses:
EDWARD E. LONGAN,
E. M. SCHUCHARDT.